UNITED STATES PATENT OFFICE 2,943,921
Patented July 5, 1960

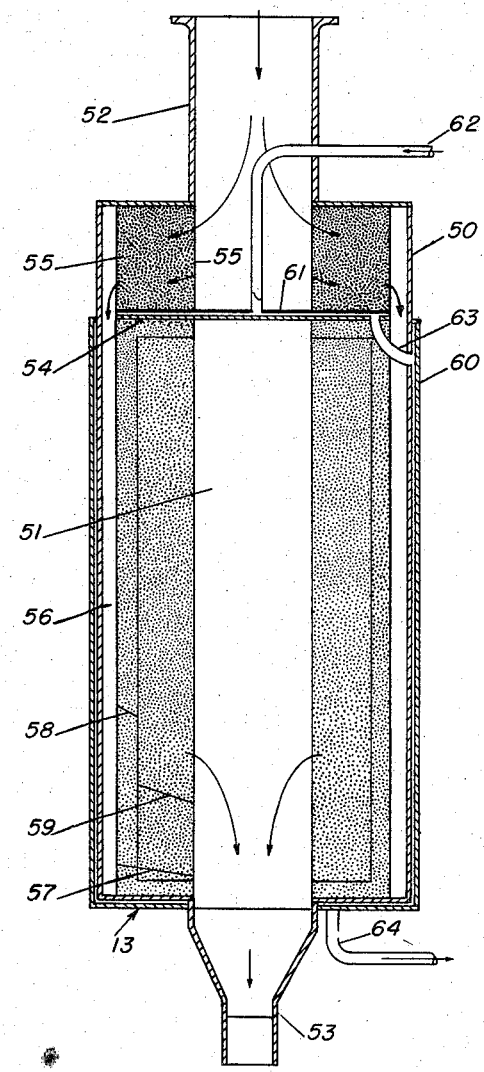

2,943,921

CATALYTIC RECOMBINER FOR A NUCLEAR REACTOR

L. D. Percival King, Los Alamos, N. Mex., assignor to the United States of America as represented by the United States Atomic Energy Commission Original application July 27, 1957, Ser. No. 600,641. Divided and this application Oct. 24, 1957, Ser. No. 692,240

2 Claims. (Cl. 23—288)

The present invention is related to a homogeneous nuclear reactor utilizing liquid fuels of the water boiler type and more particularly to catalytic recombiners associated with such reactor.

The present application is a division of application S.N. 600,641, filed July 27, 1956, entitled "Improved Water Boiler Reactor," by L. D. Percival King, which application describes the reactor system in which the catalytic recombiner described herein may be used.

It is an object of the present invention to provide an improved catalytic recombiner for use in recombining the radiolytically dissociated gases of an aqueous moderated reactor.

Another object of the present invention is to provide a catalytic recombiner which is so constructed and arranged as to prevent ignition flashback of the hydrogen and oxygen gases, thereby increasing the safety of the system in which it is used.

Other objects and advantages of the present invention will become more apparent from the following description including a drawing hereby made a part of the specification, wherein the drawing shows a sectional view of the recombiner chamber of the present invention.

Referring now to the drawing, the catalyst chamber 13 consists of a cylindrical housing 50 having a centrally disposed gas outlet channel 51, a gas inlet 52, and a gas outlet 53. The chamber is divided by wall 54. The wall 54 directs the inflowing gas from gas inlet 52, through two layers of 16-mesh stainless steel screen 55, between which is placed a flashback shield consisting of 1/16-inch stainless steel shot, to the peripheral passage 56. The stainless steel shot serves as an explosion trap, since the openings are sufficiently small to quench hydrogen-oxygen flames at gas inlet temperatures and the shot has sufficient heat capacity to stop combustion. The peripheral passage 56 is separated from central aperture 51 by element 57, consisting of a non-catalytic outer layer 58 of non-platinized alumina pellets adjacent channel 56 and a catalytic inner layer 59 of platinized alumina pellets disposed between channel 51 and layer 58. The catalyst pellets are cylindrical in form with dimensions of 3 mm. by 3 mm. having 0.3 percent platinum by weight. The number of pellets required will depend upon the gas evolution rate. The purpose of the outer layer 58 is to prevent the possibility of igniting the hydrogen and oxygen gases in channel 56 by the heat created in the catalytic recombination of these gases by the catalyst pellets 59, to reduce radiation loss to the walls and to distribute the gas uniformly onto the platinized pellets. The catalyst chamber 13 is partially surrounded by a cooling jacket 60. The wall 54 is also cooled by a jacket 61. A water inlet pipe 62 is connected to the jacket 61, and a connecting pipe 63 joins cooling jackets 61 and 60. Cooling jacket 60 is connected to an outlet pipe 64 located adjacent the gas outlet aperture 53.

In operation the gas from a nuclear reactor passes into the chamber through inlet 52 through the flashback shield 55 into channel 56. The gases then pass through inert layer 58 into the active catalyst layer 59 where, by the catalytic action of the platinized alumina pellets, the hydrogen and oxygen are recombined to form water vapor. The water vapor is then collected through outlet 53 and returned to the nuclear reactor.

The arrangement in the catalyst chamber 13 materially increases the safety factor of the reactor system. By preventing the possibility of a flashback, both through the use of the outer layer 58 and the flashback shield 55, the danger of igniting the explosive hydrogen-oxygen mixture in other parts of the system is prevented.

While presently preferred embodiments of the invention have been described, it is clear that many modifications may be made without departing from the scope of the invention. Therefore, the present invention is not limited by the foregoing description, but solely by the appended claims.

What is claimed is:

1. A catalytic recombining chamber for recombining hydrogen and oxygen formed by the radiolytic dissociation of water, comprising in combination a housing of generally cylindrical shape and having an inlet and an outlet at opposite ends thereof, an annular flashback shield disposed adjacent the inlet end of said housing to define a central passage contiguous with said inlet, said flashback shield consisting essentially of metal shaft, a baffle plate contiguous with said flashback shield and extending across said central passage, an annular catalyst bed contiguous with said baffle plate and extending to the outlet end of said housing to define a centrally disposed gas outlet channel continguous with said outlet and an annular distributor-flashback shield surrounding and contiguous with said catalyst bed, said distributor-flashback shield consisting essentially of non-platinized alumina pellets, the outer peripheries of said flashback shield, said baffle plate and said distributor-flashback shield together with said housing defining an annular flow channel for the passage of gases from said flashback shield to said distributor-flashback shield including a coolant jacket partially surrounding said housing, a coolant jacket secured to said baffle plate, pipe means connecting the coolant channels defined by said members and said coolant jackets, and means including a coolant inlet pipe extending through said housing inlet opening and connected to said baffle coolant jacket and a coolant outlet pipe connected to said housing coolant jacket to circulate a coolant through said channels and pipes.

2. A catalytic chamber for the combination of hydrogen and oxygen gases comprising in combination an elongated housing having inlet and outlet openings at opposite ends thereof, a baffle plate disposed near the inlet end of said housing to define a first passage between its outer periphery and said housing through which flowing gases must pass, means disposed between said inlet end of said housing and said baffle plate to prevent the flashback of oxygen-hydrogen combustion and defining both a central passage contiguous with said inlet opening and an outer second passage contiguous with said first passage, said flashback preventing means consisting essentially of metal shot, a catalyst bed disposed between said baffle plate and said outlet end of said housing to define both a gas outlet channel contiguous with said outlet opening of said housing and an outer third passage contiguous with said first passage, and means disposed in the inner part of said third passage between said baffle plate and said outlet end of said housing for distributing said gases onto said catalyst bed and for preventing the flashback of oxygen-hydrogen combustion from said catalyst bed to the balance of said third passage, said distributing and flashback preventing means consisting essentially of non-platinized alumina pellets, including a coolant jacket partially surrounding said housing, a coolant jacket secured to said baffle plate, pipe means connecting the coolant channels defined by said members and said coolant jackets, and means including a coolant inlet pipe extending through said housing inlet opening and connected to said baffle coolant jacket and a coolant outlet pipe connected to said housing coolant jacket to circulate a coolant through said channels and pipes.

References Cited in the file of this patent

UNITED STATES PATENTS 2,071,119   Harger _____ Feb. 16, 1937